United States Patent [19]

Forsyth

[11] Patent Number: 4,797,102

[45] Date of Patent: Jan. 10, 1989

[54] INSTRUCTIONAL GLOBE

[76] Inventor: Maria K. Forsyth, 63 Sterling Pl., W. Boylston, Mass. 01583

[21] Appl. No.: 874,608

[22] Filed: Jun. 16, 1986

Related U.S. Application Data

[63] Continuation of Ser. No. 642,649, Aug. 20, 1984, Pat. No. 4,595,367.

[51] Int. Cl.⁴ .............................................. G09B 27/08
[52] U.S. Cl. .................................................... 434/147
[58] Field of Search ............... 434/131, 132, 133, 134, 434/135, 136, 137, 138, 139, 140, 141, 142, 143, 144, 145, 146, 147, 150, 151; 273/DIG. 30

[56] References Cited

U.S. PATENT DOCUMENTS

| | | | |
|---|---|---|---|
| 457,487 | 8/1891 | Bowsher | 434/143 |
| 1,042,456 | 10/1912 | Manson | 434/136 |
| 1,523,188 | 1/1925 | Flood | 434/147 |
| 1,629,582 | 5/1927 | McClintock | 434/147 |
| 1,897,580 | 2/1933 | Lawton | 434/131 |
| 1,959,601 | 5/1934 | Schulse | 434/145 X |
| 2,083,988 | 6/1937 | Dupler | 434/131 |
| 2,496,827 | 2/1950 | Tellier | 434/143 |
| 2,515,400 | 7/1950 | Dupler | 434/145 |
| 2,537,329 | 1/1951 | Campbell | 434/131 X |
| 2,957,251 | 10/1960 | Nystad et al. | 434/147 |
| 3,016,629 | 1/1962 | Case | 434/147 |
| 3,063,163 | 11/1962 | Dukes, Jr. | 434/131 |
| 3,281,961 | 11/1966 | Tiddens | 434/131 |
| 3,316,669 | 5/1967 | Nachbar | 273/DIG. 30 |
| 3,374,560 | 3/1968 | Forsyth | 434/147 X |
| 3,495,833 | 2/1970 | Wesley | 434/150 X |
| 3,618,955 | 11/1971 | Barnes | 434/147 X |
| 4,115,930 | 9/1978 | Beck | 434/151 X |
| 4,377,286 | 3/1983 | Constantinescu | 434/131 |
| 4,494,935 | 1/1985 | Miller | 434/132 |
| 4,595,367 | 6/1986 | Forsyth | 434/147 |

FOREIGN PATENT DOCUMENTS

| | | |
|---|---|---|
| 10681 of 1899 | United Kingdom | 434/133 |
| 4489 of 1909 | United Kingdom | 434/131 |

OTHER PUBLICATIONS

Nystrom '65, Catalog 1965, Cover and p. 43.

Primary Examiner—William H. Grieb
Attorney, Agent, or Firm—Robert T. Gammons

[57] ABSTRACT

An instructional globe facilitates the guided or self-directed study of terrestrial geography. A globe-shaped body is constructed so that major geographical features are represented on detachable appendages. Cues are provided for the proper placement of the appendages on the surface of the globe-shaped body, the cues consisting of niches, embossed or printed shapes, or indentations, unambiguously corresponding to the appendages. The globe-shaped body may be built up from a skeletal framework to hold a number of blocks, the blocks together forming a spherical surface. Appropriate portions of geographical features, or portions of cues, are formed on the blocks. A number of means are shown for attaching the blocks to the framework and the segments to the body. A series of embodiments apply the invention to the problems of teaching geography to students with varying or progressing learning skills.

14 Claims, 7 Drawing Sheets

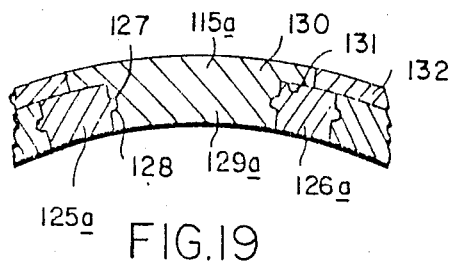
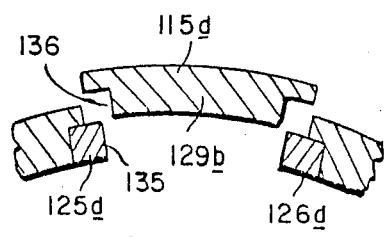
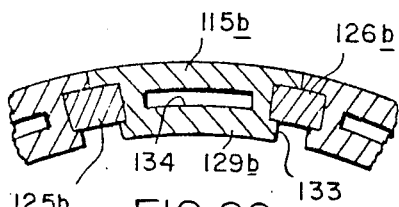
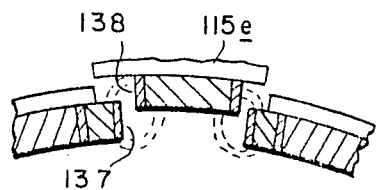
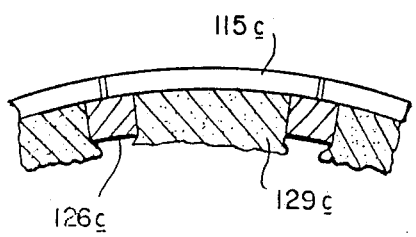
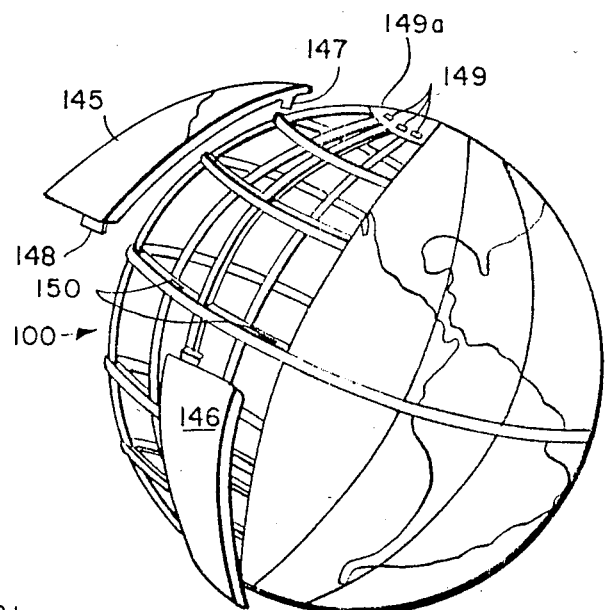
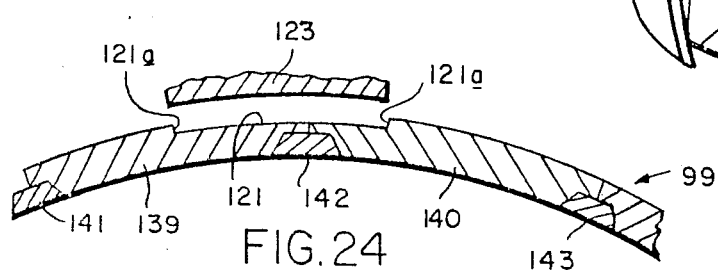
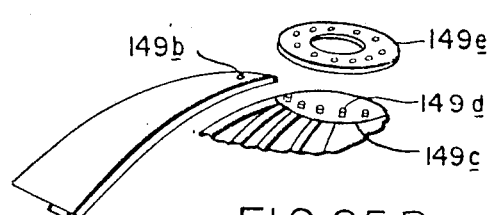
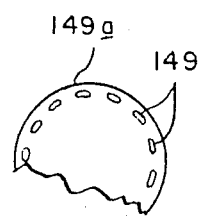

INSTRUCTIONAL GLOBE

This is a continuation of co-pending application Ser. No. 06/642,649 filed on Aug. 20, 1984, now U.S. Pat. No. 4,595,367, granted June 17, 1986.

BACKGROUND OF THE INVENTION

Learning geography, especially on a global scale, involves the exercise of a great deal of spatial imagination, often in three dimensions. The ability to use this kind of imagination is usually crude in the very young and must be slowly nurtured and developed during the educational process. Moreover, in the early stages of the development of the necessary skills, different children utilize different learning modalities. Even the same child at different levels of development may use different learning modes. An acceptable general method of developing this skill is to begin with the examination of highly concrete representations of many geographic and geometric concepts, using aural, visual, and tactile reinforcement. A comfortable familiarity with such concrete representations lays a foundation for the development of a more abstract framework in which a student may organize the concepts involved.

To this end, educators have developed a number of visually or tactually stimulating models of geographical phenomena, such as relief maps and variations of the well known terrestrial globe. Many of these devices are suitable for a form of programmed teaching in which a terrestrial globe is built up piece by piece from a large number of separate parts in the form of a kit. An example of such a device is disclosed in my own U.S. Pat. No. 3,374,560.

These models fall short of the ideal teaching aid in a number of respects. For instance, many of the prior devices miss an opportunity to interest the very young by lacking a sufficient element of "play". On the other hand, terrestrial globes have been made in the form of puzzles in which the element of play has defeated the educational value of the device. In such cases, there is insufficient direct visual or tactile reinforcement of geographical ideas. Some of the prior terrestrial globes allow the placement of component parts in geographically inconsistent positions, thereby reinforcing inaccurate geographic relationships. Many such globes can be assembled only by a person already familiar with terrestrial geography, offering no assistance to the untutored student who is working or playing alone. Further, the means used to attach component parts to these globes have tended to be either unreliable or overly complicated for a young person whose hand/eye coordination is not fully developed In general, prior globes have been designed with insufficient attention to the differing cognitive and perceptual levels, learning modes, and coordination ability of different age groups and individuals. These and other difficulties experienced with the prior art devices have been obviated in a novel manner by the present invention.

It is, therefore, an outstanding object of the invention to provide a teaching aid in the form of a terrestrial globe which may be partially assembled by the student or teacher in an interesting and pleasing manner, in order to reinforce the geographical ideas involved.

Another object of this invention is the provision of a teaching aid in the form of an instructional globe having sufficient elements of play to hold the interest of a distractible young student.

A further object of the present invention is the provision of an instructional globe which may be partly assembled by a geographically naive student by means of a series of visual or tactile cues to the proper placement of the component parts.

Another object of the present invention is the provision of an instructional globe with the flexibility to be used to teach either several students at different ability levels or a single student with progressing abilities and changing learning modalities.

It is another object of the instant invention to provide an instructional globe which may be partially assembled by means which are reliable and easily manipulated without requiring highly developed coordination.

A further object of the present invention is the provision of an instructional globe which is simple in construction, inexpensive to manufacture, and capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

Generally, the invention is an aid for the teaching of physical and political geography which appeals to the tactile and visual senses, and consists of a globe-shaped body and a number of information-laden appendages attached to the body in manners and in positions to visually or tactilely reinforce geographical habitat concepts of the world. The appendages are detachable to allow partial assembly as part of the learning process. In an embodiment for the very young, the appendages may consist of medallions bearing images having geographical significance. The medallions are removably attached to the globe-shaped body in a pivoting manner to move in an oscillating mode in response to rotation of the globe-shaped body.

A more advanced embodiment consists of a globe-shaped body with appendages, the appendages alternatively (or in addition) comprising a number of spherical surface segments, shaped, in outline, like major geographical features of a terrestrial globe such as continents and ocean currents A variety of means are provided for removably attaching the surface segments to the body at their geographically proper positions The proper positioning of the segments is facilitated by a plurality of cues formed on the body, each cue resembling in shape its corresponding spherical segment. The cues are visually or tactilely prominent. In a lower level embodiment, indentations in the globe-shaped body provide the cues, the segments being inserted in the indentations.

In a higher level embodiment, the globe-shaped body consists of a transparent hollow sphere. The cues are embodied in etched outlines on the inside or outside surface of the sphere. The segments are in the form of overlays.

One embodiment of the globe-shaped body of the invention generally comprises a globe-shaped skeletal framework made up of latitudinal and longitudinal cross members. Together the cross-members define a plurality of spherico-polygonal windows. Each of these windows is provided with a removable but closely fitting block. Each block has an outer surface which is appropriately curved and provided with a geographically significant representation, so that when the blocks are fit into their corresponding windows, their outer surfaces line up to form a globe-shaped body having a relatively continuous surface and geographically accurate representations of terrestrial features. The skeletal framework and/or blocks may be comprised of a resilient material such as to enable snapping the blocks into the windows. Alternatively, the skeletal framework may have attached thereto spherical-triangular or spherical wedge-shaped elements or slices attached to the equator and the poles by notches, pegs and the like.

A hemispherical shell is provided, of slightly larger radius than the globe-shaped body and pivotally attached to the body in a manner to illustrate the so-called "circle of illumination". An equatorial disk or a "quarter" disk is employed to illustrate the strata of the Earth's interior.

Desirably the globe-shaped body is provided with a support in the form of a base to which there is fixed one end of a shaft inclined at an angle corresponding to the inclination of the axis of the earth to the plane of the eliptic upon which the globe-shaped body is rotatably mounted. Optionally, the support includes an arcuate frame of larger radius of the curvature than that of the globe within which the globe is rotatably supported by suitable bearing means with a clearance space between the surface of the globe and the arcuate frame and the latter is provided with graduations representing degrees and graduations representing the climatic zones between the poles.

BRIEF DESCRIPTION OF THE DRAWINGS

The character of the invention however may be best understood by reference to some of its structural forms, as illustrated by the accompanying drawings, in which:

FIGS. 19 through 24 are alternative structures for securing the appendages to the globe of FIG. 18;

FIG. 25 is a perspective of a skeletal globe, the surface of which is constructed of spherically triangular segments;

FIG. 25A is a plan view of a polar cap for the globe of FIG. 25;

FIG. 25B is a fragmentary perspective of the globe providing alternative fastening means for the triangular segments;

DESCRIPTION OF THE PREFERRED EMBODIMENT

Figure 1:
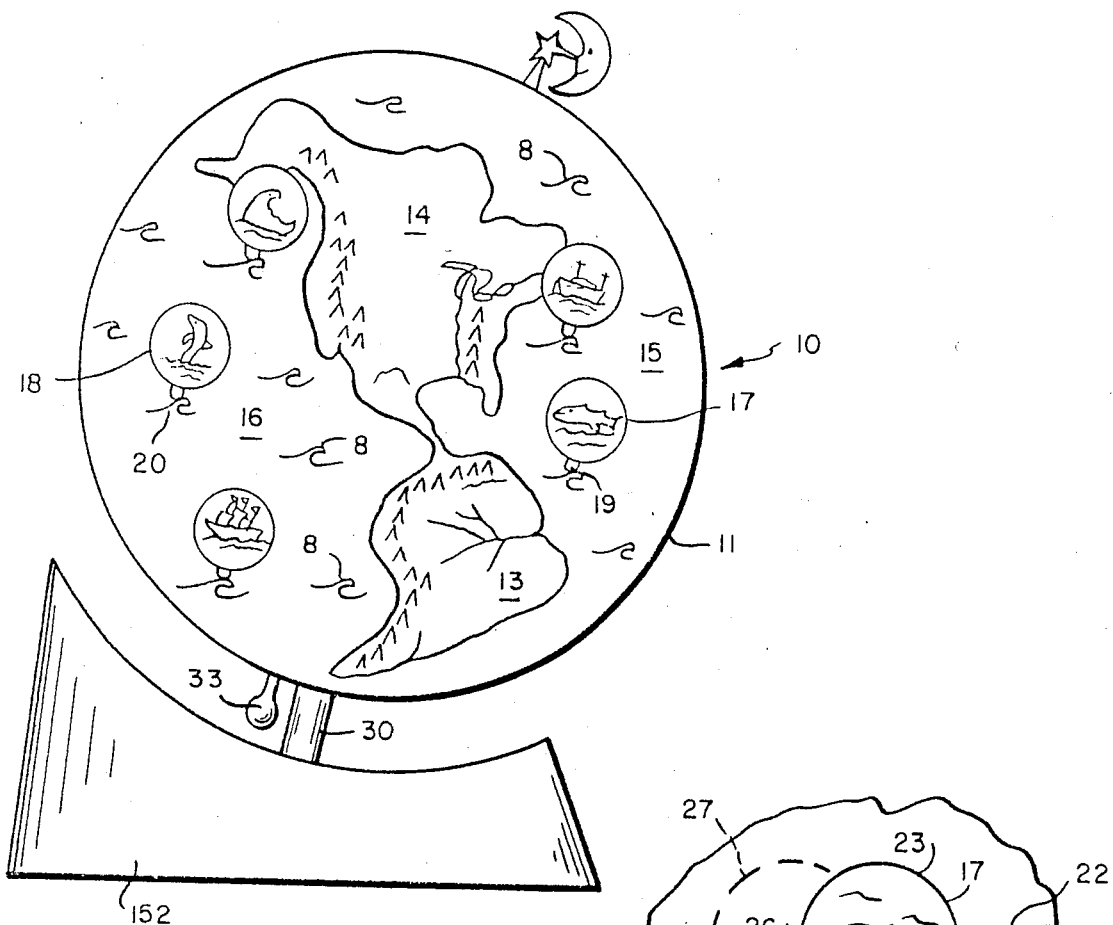
FIG. 1 is an elevation of an elementary instructional globe embodying the principles of the present invention.
Figure 2:
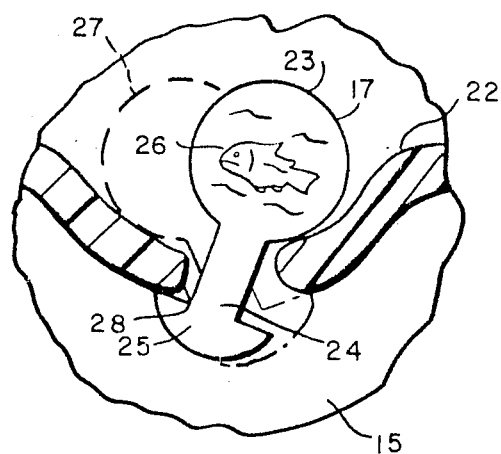
FIG. 2 is a detail section.

Referring first to FIG. 1, wherein the general features of a globe embodying the present invention are shown, a first level instructional globe is illustrated and referred to generally by the numeral 10. A globe-shaped body 11 is provided having highly stylized and simplified three-dimensional representations of terrestrial features, such as continents 13 and 14 and oceans 15 and 16. A number of detachable appendages in the form of medallions may be added such as 17 and 18, each bearing a representation of a geographically significant fact or feature. Each medallion FIG. 2 is provided with a corresponding "niche" or location such that on attaching each medallion to its corresponding niche, the proximity of the representation on the medallion and the location of the niche combine to visually reinforce a geographical idea. In this embodiment, the medallions 17 and 18 bear pictures of certain sea creatures, and their respective niches 19 and 20 correspond to the usual habitats of the sea creatures.

Desirably, the surface of the globe in the ocean part is configured to simulate waves 8 and the niches, FIG. 2, comprise concave depressions 22 at the base of the waves, at the bottom of which there are openings 28. The medallions are of circular configuration embodying a head part 23 bearing the representation 26, a neck part 24, and a base 25. The head part 23 has a smaller radius of curvature than the concave surface of the depression 22. For this reason, when a medallion is placed in its niche with the base and neck part inserted in the opening, a rotational motion of the globe-shaped body about the globe's central shaft 30 imparts an oscillating motion to the medallion, the extent of which is shown by the dotted line 27 in FIG. 2. The oscillation is sustained by momentum of the base 25. This motion is pleasing to a young child and helps to reinforce the associated geographic fact. The child will want to give each medallion "a ride around the world" by placing it in its proper niche.

Figure 3:
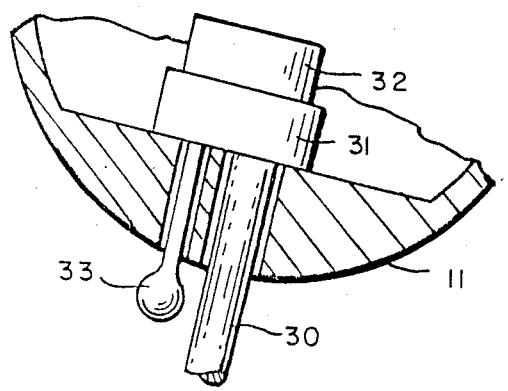
FIG. 3 is a detail section.

The child's attention can be further focused by the provision, as shown in FIG. 3, of a motor 31 and a music box 32 inside the globe-shaped body. The motor and music box should be of the wind-up variety, preferably wound by a common key 33. The motor imparts rotation to the globe, and may also power the music box.

The educational versatility of this first level globe may be enhanced by the provision of further appendages in the form of appliques or inserts bearing highly simplified and stylized representations of land masses, such as continents 13 and 14. These should be attachable and detachable, with cues provided for their proper placement. A variety of embodiments of this form of the invention are described below in connection with higher level globes. The particular type of attaching means, and the choice of cues, will be consistent with the coordinating ability of the very young child.

Figure 4:
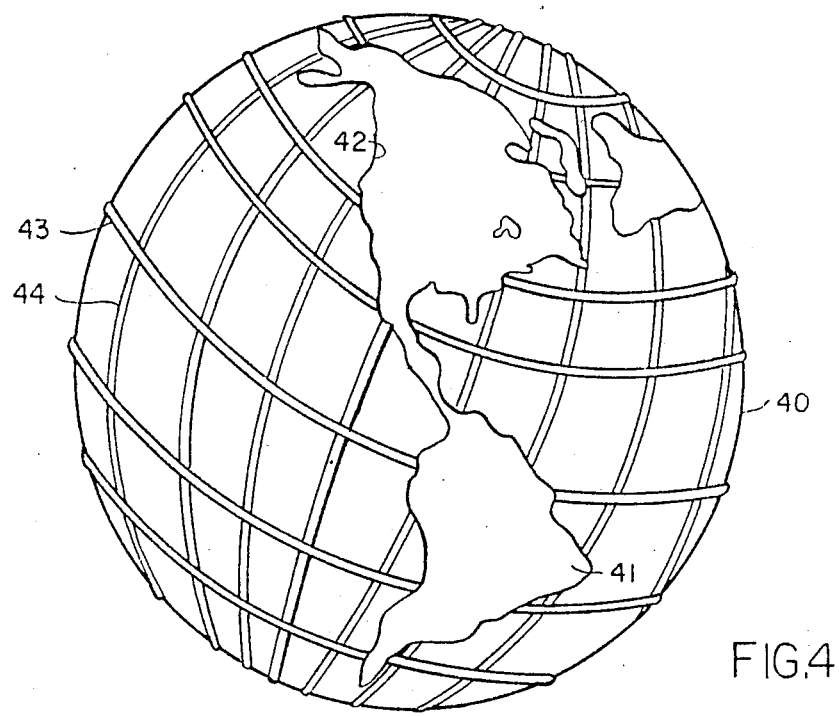
FIG. 4 is a perspective view of an instructional globe according to the present invention in which the cues are in the form of indentations.
Figure 5:
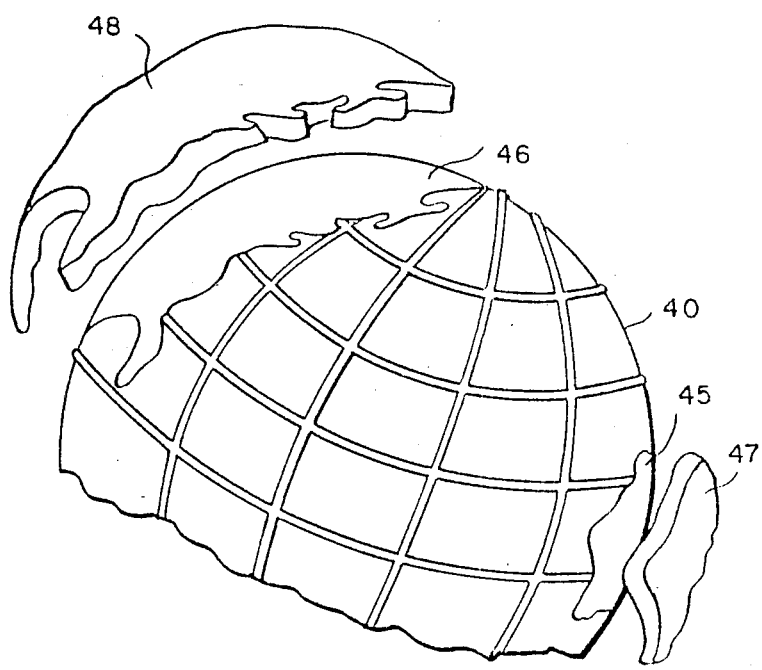
FIG. 5 is a fragmentary perspective illustrating the correlation of spherical segments to indented cues.

A second level embodiment of the invention is illustrated in FIGS. 4 and 5. A globe-shaped body 40 is provided with cues for the placement of appendages in the form of appliques or inserts bearing geographical representations. The cues may be in the form of shallow indentations such as 41 and 42 in the surface of the body or may be defined by printed, embossed or otherwise formed lines on the surface. Major lines of latitude and longitude are represented by raised ribs such as 43, 44. To avoid obscuring the indented cues, these raised ribs do not cross the indentations, but stop at the edges.

As shown in FIG. 5, the indented cues each correspond in outline to a spherical surface segment representative of a geographical feature such as a continent, island, ocean current, etc. For example, cues 45 and 46 correspond in configuration respectively to segments 47 and 48 each representative of land masses.

Figure 6:
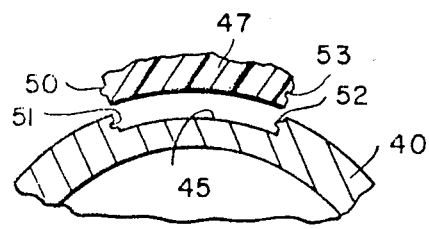
FIGS. 6 through 12 are sections showing alternative means for attaching the segments to the globe within the indented cues.
Figure 9:
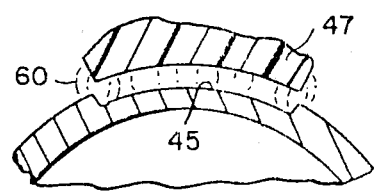
Figure 7:
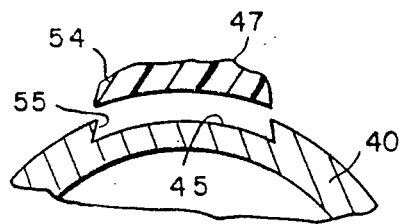
Figure 10:
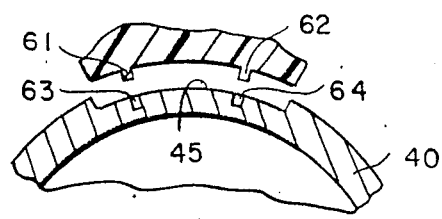
Figure 8:
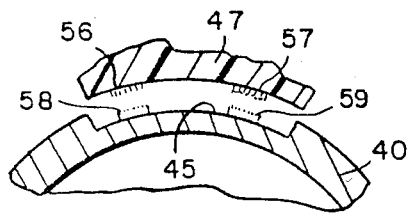
Figure 11:
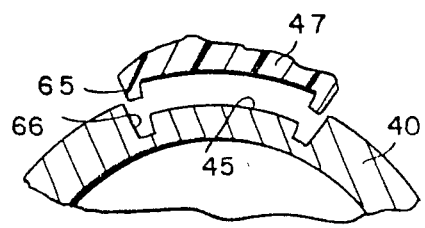
Figure 12:
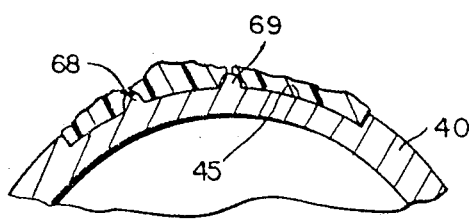

A number of novel, reliable, and uncomplicated means to secure spherical segments such as 47 and 48 to the globe-shaped body 40 within a cue 45 or 46 are shown in FIGS. 6 through 12. FIGS. 6, 7, 11 and 12 show means which are appropriate mainly when the cue 45 or 46 consists of an actual indentation or recess in the globe-shaped body. FIGS. 8 through 10 illustrate means which are appropriate also when the cues consist of mere printed or embossed outlines, as will be described below. FIG. 12 shows means appropriate when the cue comprises a recess, and the spherical segment is further divided into subsegments (for example, to represent subcontinents, countries, states, etc.)

In FIG. 6, the spherical segment 47, representative of a continent, is shown in cross-section to be appropriately curved to match a curved recess on the spherical surface, which recess constitutes the cue 45. Both the globe-shaped body and the spherical segments are composed of a stiff but resilient material such as plastic. The spherical segment is provided with a rib 50 around its peripheral edge and a notch 51 is provided around the corresponding peripheral edge of the recessed cue. Thus, the spherical segment may be snapped into place in the recess and held there by the engagement of rib 50 and notch 51. Alternatively, the rib may be provided on the periphery of the recess as indicated at 52 and the notch 53 provided on the peripheral edge of the spherical segment.

In the means illustrated in FIG. 7, the spherical segment 47 is provided with a beveled edge 54 and the cue 45 is provided with an undercut edge 55. The segment and the globe-shaped body are formed of resilient material as above, and the segment may be snapped into place and removed as desired.

Whatever the nature of the cues may be (either recesses or mere printed or embossed outlines), the attaching means shown in FIGS. 8 through 10 may be appropriate. In FIG. 8, the segment 47 is attached by means of complementary pairs of hook and loop type fastening material, such as Velcro TM. In the illustration, spots of hook material 56 and 57 are applied to the underside of the segment as by adhesive. Spots of the loop material 58 and 59 are applied likewise in corresponding spots on the globe-shaped body.

As illustrated in FIG. 9, both the spherical segment 47 and the globe-shaped body 40 may be formed wholly or partially of ferromagnetic materials. These may be properly magnetized in relation to each other, so that the segment will be attracted magnetically to its corresponding cue 45. Likewise, the means may be produced by forming the parts from electrostatic plastic, and setting up an electrostatic attraction between the segment and cue in the manner of the electrostatic plastic games marketed as Colorforms TM. Both types of attractive forces are indicated by lines of force 60.

The segments may also be removably held in place by a number of male/female connector assemblies, such as pins 61 and 62, and holes 63 and 64 of FIG. 10. Equivalents, such as tabs and slots, may also be used.

FIG. 11 shows a further means for attaching the segments. The segment 47 is provided with a lip 65 around its periphery on its concave side. An indented channel 66 is provided around the periphery of the recessed cue 45. The lip 65 fits snugly in the channel 66 to hold the segment.

The means shown in FIGS. 8 through 11 are also appropriate to attach a subdivided segment. If the means of FIGS. 6 or 7 are used, however, an equivalent of the structure illustrated in FIG. 12 should be employed. In this case, peripheral edges of the subdivisions which do not engage the outer peripheral edge of the cue, instead engage supplementary securing means such as the ridges 68 and 69, to engage notches on the inner peripheral edges of the subdivisions. The ridges further constitute supplementary cues for the proper placement of the subdivision pieces, since they necessarily follow the outlines of the subdivisions.

The information or geographical representation borne on the spherical surface segments can vary widely. As mentioned above, the simple outline of land masses, or the size and direction of ocean currents, may be indicated on the segments. By structuring the segments so as to be detachable, alternate segments can be provided, each carrying a different representation. Thus, segments bearing topological information, agricultural divisions, different language and/or ethnic areas may be employed. Each of these segments is structured to be attached in one of the manners described above to the globe-shaped body within its corresponding configured cube.

Moreover, on a given segment, or anywhere on the globe-shaped body, provision may be made for the placement of appendages representing highlights of the local geography, such as animals, ethnic types, architectural or engineering accomplishments, flags, etc. It is now evident how to employ, for this purpose, any of the various attaching means elsewhere disclosed in this specification.

Figure 13:
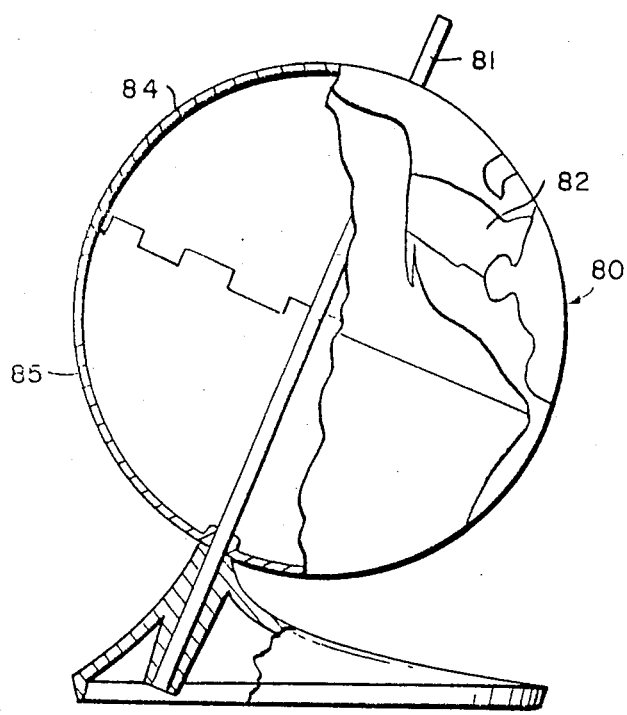
FIG. 13 is an elevation partly in section of a globe formed of two hemispherical sections.

A third level embodiment of the present invention is illustrated in FIG. 13. A transparent or nearly transparent globe-shaped body 80 is mounted on a shaft 81. Spherical surface segments carrying geographic representations are attached to the surface of the globe. The segments are embodied in the form of overlays such as 82, properly curved to fit on the surface of the transparent body. The overlays 82 representing land masses are opaque, while those representing water are clear blue.

Figure 14:
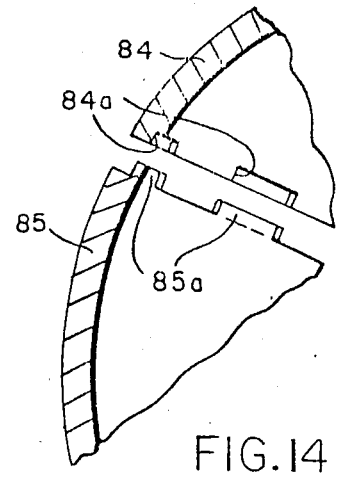
FIG. 14 is a fragmentary section o FIG. 13 showing means for joining the hemispheres.
Figure 13A:
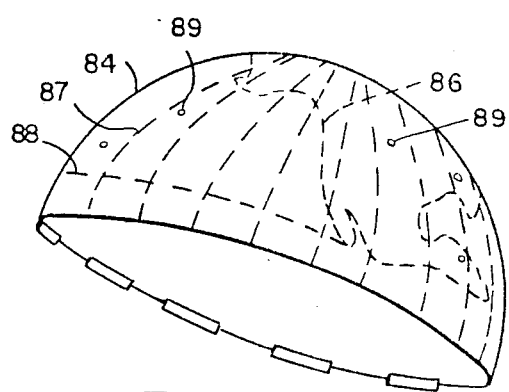
FIG. 13A is a perspective of one hemisphere of the globe shaped body of FIG. 13.

The transparent body 80 is preferably formed of two hollow hemispheres 84, 85. As is shown in FIG. 13A, which depicts one of the hemispheres 84, the cues of the invention are here embodied in etched, printed, or embossed outlines such as 86 formed on the inside. The cues are visible due to the transparency of the globe-shaped body 80. Lines of latitude and longitude such as 87 and 88 may also be imprinted in this manner on the inside or outside surface. In the preferred embodiment the hemispheres are connected by pressure fittings 84a, 85b as shown in FIG. 14, or by like connections that will allow them to be joined and separated easily.

The overlays 82 representing land masses, bodies of water, various countries and the like may be attached to the globe by means of pins inserted into holes 89 in the surface of the globe or by any of the means shown in FIGS. 6 to 12. Velcro, electrostatic plastic, tape, magnetic tape and magnets may also be used.

Figure 15:
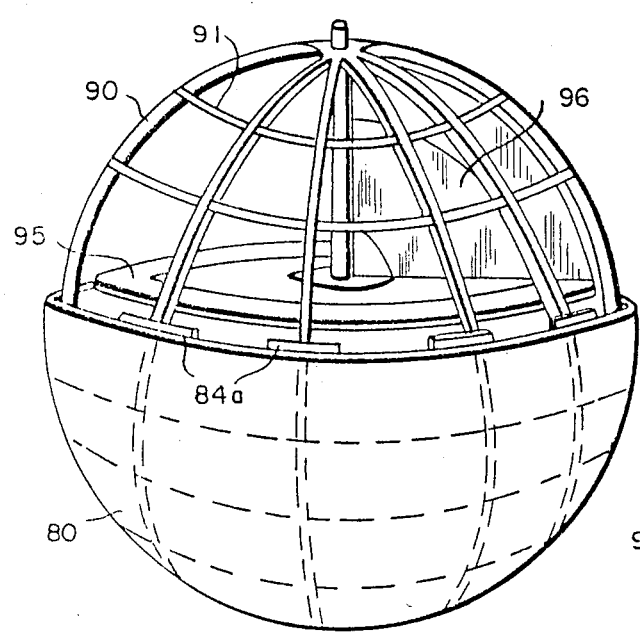
FIG. 15 is an elevation partly in section of a globe of skeletal construction showing internal structures representing the internal structure of the earth.
Figure 16:
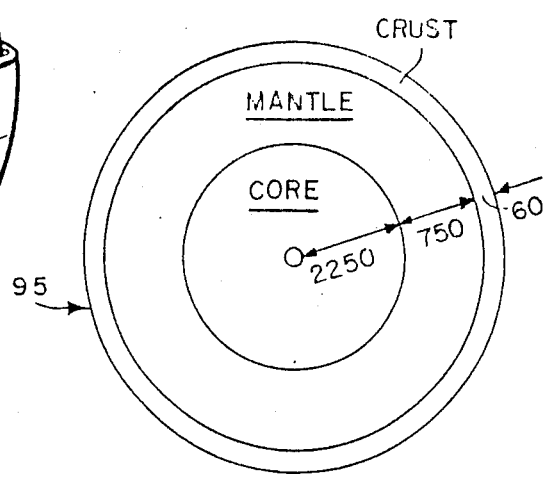
FIG. 16 is a diametral section perpendicular to the axis of rotation.

The impact of this third-level globe may be enhanced by the inclusion of a skeletal framework inside the globe. This is represented in FIG. 15 by a number of longitudinal members such as 90 and latitudinal members 91. A further enhancement consists of an equatorial (or otherwise diametric) disk 95. As shown in FIG. 16, the disk 95 is so structured and enfigured to hold and make available information about the interior of the earth, its various layers and their relative and absolute size relations. A polar disk 96 may be included depicting the equatorial zones between the poles.

Figure 17:
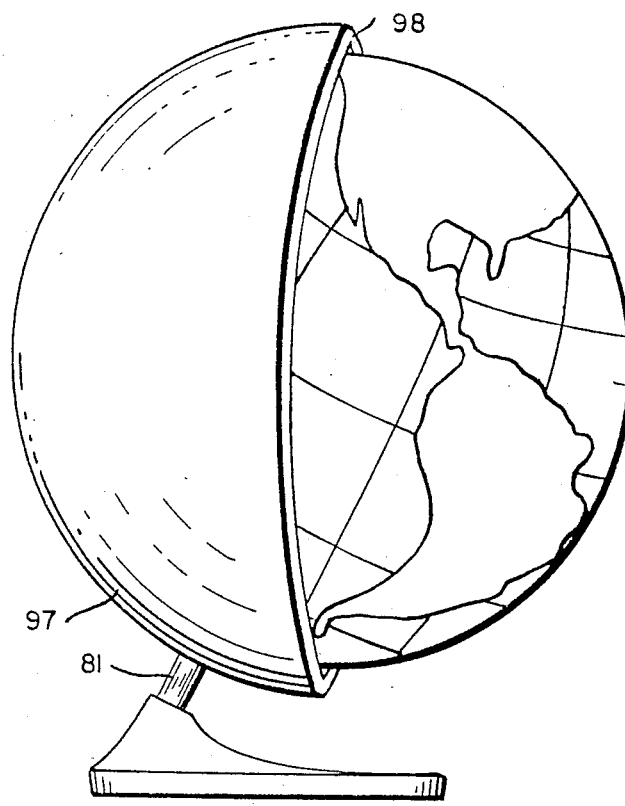
FIG. 17 is an elevation of a globe provided with a "circle of illumination"

For more advanced students, either the second- or third-level globe may be equipped with a structure for illustrating the "circle of illumination" (that is, the division of earth into day areas and night areas by the earth's rotation with respect to the sun.) As shown in FIG. 17 (with the embodiment of FIG. 13 as an example), a thin hemispheric shell 97 is illustrated, whose inner radius is slightly larger than that of the globe-shaped body 80. The hemispheric shell is so attached to the shaft 81 that half of the globe is encompassed by it. The diametric edge 98 of the hemispherical shell is arranged to lie in a plane perpendicular to the plane of the ecliptic, so that it may properly be used to illustrate the progression of the "circle of illumination" as the globe inside, rotatably secured to shaft 81, is rotated. The thin hemispheric shell 97 is preferably made of almost transparent, gray material such as tinted plastic, to imitate shadow.

Figure 18:
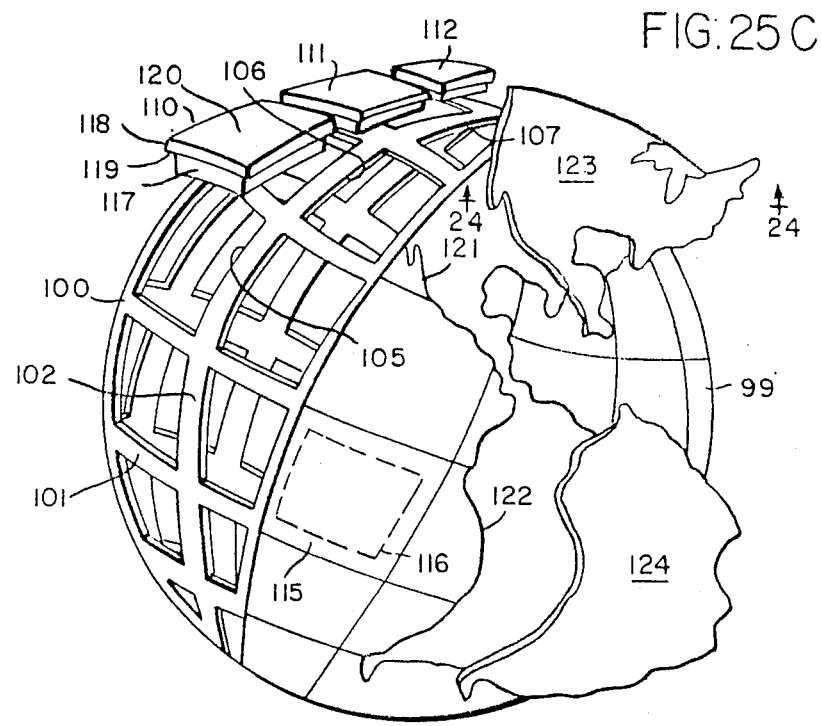
FIG. 18 shows an exploded view of an alternative form of a skeletal globe provided with window openings for receiving appendages.

Although the globe-shaped body of any of the above embodiments may be formed as an integral unit, such as by injection- or blow-molding, the instructional value and play aspect are both increased when the student builds the globe-shaped body up from component parts as illustrated in FIG. 18. This may be referred to as a fourth-level globe. To this end, the body 99 is preferably made up of a globe-shaped skeletal framework 100. The framework is composed of latitudinal cross-members such as 101 and longitudinal cross-members such as 102.

The crossing members define a regularly arranged plurality of windows such as 105. The shape of such a window whose sides are spherical lines of latitude and longitude will be defined as "spherico-polygonal". A solid sphere can be used provided with recesses corresponding to the windows 105, the sides of which represent latitude and longitude.

The remainder of the globe-shaped body 99 is filled out by the insertion of specially constructed blocks in each window. Reference numerals 110, 111, 112 refer to a number of such blocks in unassembled state, that is, removed from their respective windows 105, 106, 107. Numeral 115 on the other hand, indicates a block inserted in the appropriate window 116.

The blocks of the present invention, exemplified by 110, generally consist of a lower section 117 and an upper section 118. The lower section is adapted to be inserted in the window corresponding to the given block (in this case 105) and to be secured there by mechanisms which will be described below. The upper section 118 projects beyond the lower section on each side by about half the width of the corresponding latitudinal or longitudinal cross member. This projection has the effect of forming a detent 119 to properly limit the depth of insertion of the block. Consequently, the outer surfaces of the blocks will be properly aligned when the blocks are inserted and will together form a smooth and substantially continuous spherical surface. The outer surfaces, which are exemplified by 120, are provided with the parts of the cues which are appropriate for the respective position of each block. In other words, the portions of the printed, embossed, or indented outlines which are to appear on the final globe-shaped body are provided in appropriate part, on the outer surfaces of each block. Thus, cues 121 and 122 indicate the location respectively of information-bearing appendages 123 and 124 (which, in this embodiment are in the form of overlays) or inserted spherical surface segments).

A number of alternative means of securing the blocks in their windows are illustrated in FIGS. 19 through 27.

In FIG. 19, the block 115a, formed of resilient material, is secured to the cross-members 125a and 126a (which form the window 116) by the engagement of a rib 127 along the peripheral edge of the window, with a notch 128 around the peripheral edge of the lower section 129a of the block. The upper section 130 of the block extends beyond the lower section to form a detent such as 131. The upper section 130 extends about one-half the width of cross member 126a to meet with the upper section 132 of an adjacent block. Thus, the blocks together form a substantially continuous and smooth surface. Each of the alternative securing means described below also includes such a detent-forming extension of the upper section of the block.

In FIG. 20, the lower section 129b of the block 115b extends below the cross members 125b, 126b and is formed of very resilient material, such as soft rubber A slight lip 133 engages the bottom of the cross members To add to the flexibility of the block, the lower section 129b may be formed of a hollow shell with a central cavity such as 134.

A very safe, inexpensive but effective manner of securing the blocks, as illustrated in FIG. 21, is to form the lower section 129c from a spongy material. This can be actual sponge, an artificial sponge of plastic, a block of foam rubber, or equivalent materials. The lower section of the block 115c may be simply squeezed into its window. As the figure shows, the block is held by the pressure of the cross-members, such as 126c.

A further means of securing the blocks (e.g. 115d) is shown in FIG. 22. There, the cross members 125d, 126d are made with an outward bevel corresponding to an inward bevel on the lower section 129d, and complementary friction increasing means are formed on contacting surfaces, such as 135, 136. Such means include a roughening of both surfaces, strips of cloth, or strips of hook-and-loop fastening material (such as Velcro TM).

As shown in FIG. 23, the blocks may also be made up of magnetic material or provided with attracting complementary ferromagnetic elements such as 137, 138 in positions to releasably hold the block when it is inserted correctly in its window.

The way the blocks and indented cues may be integrated is illustrated in FIG. 24 which is a cross section on line 24—24 in FIG. 18. As shown in the cross section, two blocks 139, 140 are secured by any of the means shown in FIGS. 20 through 23 (or their equivalents) to cross members 141, 142, 143 to form a portion of the globe-shaped body 99. Block 139 is provided with a portion 121a of cue 121. In this figure, the cue 121 is an actual indentation having the shape of North America or a subdivision thereof. Block 140 carries a further portion 121b of cue 121. Spherical segment 123 corresponds to the cue formed by the joining of portions 121a and 121b and is secured to the globe-shaped body by any of the means illustrated in FIGS. 6 through 12 or their equivalents.

As an alternative structure for this fourth-level globe, FIG. 25 illustrates a skeletal framework 100 as in FIG. 18. However, in the place of the spherico-polygonal blocks, a number of "tapered" or spherically triangular sections, such as 145 and 146, fill in the framework and bear the cues. Each section may be attached to the framework, as is section 145, by the insertion of a polar tab 147 in a polar slot 149 formed in a cap 149a FIG. 25A and by the insertion of an equatorial tab 148 into an equatorial slot 150.

Figure 25C:
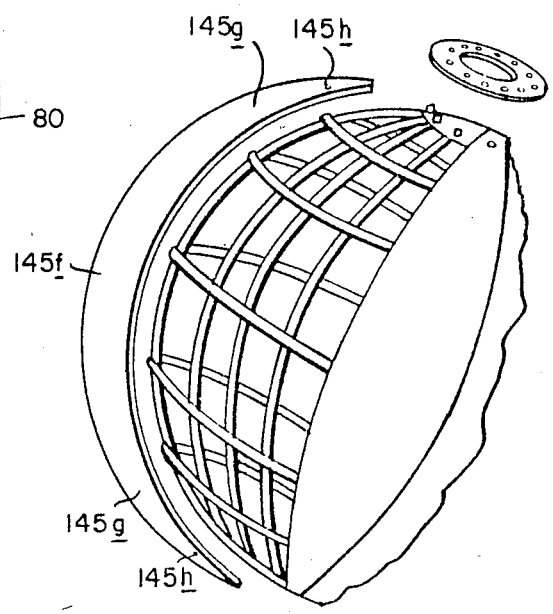
FIG. 25C is a perspective of a skeletal globe, the surface of which is constructed of spherical wedge-shaped elements.

As alternatives to the polar tab/slot means, holes 149b may be provided at the punctate ends of the triangular sections FIG. 25B and an annular polar element is then provided having pegs 149d extending therefrom on one side. The pegs are inserted through the holes in the triangular sections, holding them in proper position. If the pegs are inserted upward from below a further annular disk 149e may be provided, having holes which correspond to the pegs and may be pressure fitted over them to further secure the triangular sections. Optionally, FIG. 25C, "wedge" or "slice" shaped sections 145f may be used, each having two polar, punctate ends 145g containing holes 145h secured as described above to each pole of the skeletal framework. The broad part of these doubly tapered sections may or may not be secured to an equatorial element.

Figure 26:
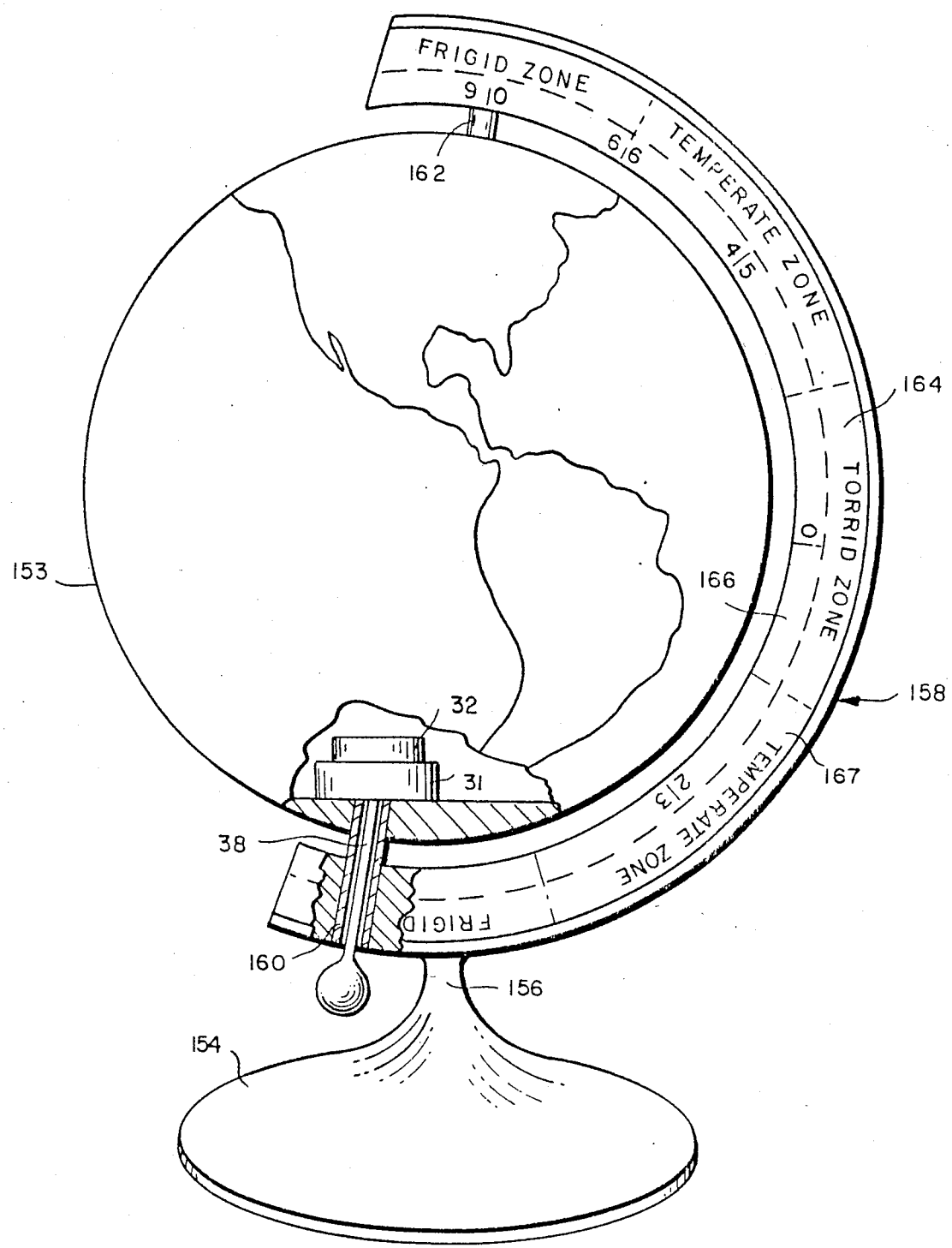
FIG. 26 is an elevation of a globe provided with a stand embodying an arcuate support depicting degrees and zones.

Desirably, the globe-shaped body, in whatever form, is provided with a support for convenience in assembly, for examination and for study, and for this purpose a base 152, FIG. 1, may be employed, to which the lower end of the shaft 30 is fixed with its axis at an angle corresponding to the inclination of the axis of the earth to the plane of the ecliptic. The globe 11 is rotatable about the shaft 30, and as previously related, can be rotated about the shaft 30 by a motor 31, FIG. 3. Alternatively as shown in FIG. 26, the globe 153 is supported by a support comprising a base 154 and neck 156 to which the lower end of an arcuate frame 158 is detachably or permanently fixed. The arcuate frame 158 is of larger diameter than the globe. The globe is mounted between the ends of the frame in concentric relation thereto by bearing means 160 and 162, with a clearance between the surface of the globe and the inner side of the frame of sufficient magnitude to clear any protrusions on the surface of the globe due to the presence of appendages attached thereto. The lower bearing 160 can be a hollow shaft for receiving the winding stem of the key 38 for the motor. The arcuate frame 158 is desirably provided with flat surfaces 164 disposed in a diametral plane containing the polar axis and is provided with divisions 166 representing angular distances and with divisions 167 representing the zones between the opposite pole, to wit the North and South frigid zones, the North and South temperate zones, and the equatorial torrid zone.

The use and advantages of the invention are apparent from the above description of the parts and their interrelations. In brief, a teacher or child at study or play constructs the above described globe from a collection of parts in an intermediate state of assembly.

The amount of assembly demanded of the child in a given context depends upon the features or geographical facts to be learned, as well as on his interest, perceptual level, learning modes, coordination, and so on.

In general, the level-one globe of FIG. 1 encourages the child, by play, to distinguish land from water, land animals from sea animals and the proper location of sea vessels.

One can look upon the embodiment of FIG. 4 as a second-level globe in which the student readily inserts appendages laden with geographic information in the proper indentation, reinforcing the proper placement of these features. As the student's conceptualization powers grow, appendages laden with more sophisticated information are made available.

The embodiment of FIG. 13 represents the next step in learning growth, when the student needs less prominent cues as to the proper placement of the overlays.

In what may be called a fourth-level of development, the child may progress to the embodiment of FIG. 18. The student has learned the concepts involved in latitude and longitude and the general location of continents and the like. He is then in a position to construct the globe-shaped body from blocks or sections. Each of these blocks or sections carries a portion of the cues the student will use to guide his proper placement of the appendages. The geographic concept represented on each appendage will be thereby reinforced.

The teacher may construct the entire globe during a lesson. For example, she may start with a skeletal framework, inserting the blocks in their proper places to form the globe-shaped body with its collection of cues. She may then attach the appendages in their proper places and attach the shaft, a stand, and the hemispherical shell, rotating the globe to illustrate the progression of the circle of illumination.

Or, the teacher may present a completed globe-shaped body (including its cues), to the less knowledgable child, who will then apply the spherical segments with guidance from the cues. This will begin reinforcement of geographical relationships, especially if cues are simple outlines but the spherical segments are information-laden. Thus, the outer surfaces of the segments may have stylized topography, political divisions, agricultural indicia, climate indications, indications of the flora and fauna indigenous to a region, a representation of air or ocean currents, etc.

Finally, a relatively sophisticated student may be given a skeletal framework, a collection of blocks, and a collection of appendages as described above and may be asked to form the globe-shaped body, attach the appendages, and apply the circle of illumination by himself. A vast number of geographical concepts are reinforced concretely in this manner.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. An instructional globe comprising:
(a) a globe-shaped body;

(b) a plurality of preformed spherical surface segments, the spherical surface of each segment structurally representing a portion of a geographical globe surface;

(c) detachably interengageable means on the globe-shaped body for removably attaching each spherical surface segment to the globe-shaped body at a pre-established position; and (d) a plurality of cues formed on the globe-shaped body, each cue having a correspondence in shape to a set of said spherical segments whereby the placement of each of said segments in its respective pre-established position is facilitated, and wherein said cues comprise a plurality of indentations and wherein each of said spherical segments is geometrically similar in outline to a corresponding indentation.

2. An instructional globe according to claim 1 wherein said globe-shaped body comprises a skeletal framework having a plurality of latitudinally crossing members and a plurality of longitudinally crossing members, the crossing members defining a plurality of spherical, polygonal windows in the framework and wherein said plurality of performed surface segments comprise a plurality of spherical, polygonal blocks, each adapted to fit closely into a corresponding one of said spherical, polygonal windows, each block having an upper portion defining a top surface bearing a geographically significant representation which is relatively positionally appropriate when the blocks are fitted into their corresponding windows and a lower portion defining means for removably securing the block in its corresponding window.

3. An instructional globe according to claim 1 wherein said globe-shaped body comprises raised crossing ribs representing lines of longitude and latitude, said ribs defining said cues on the globe-shaped body and wherein each of said plurality of spherical surface segments in adapted to fit closely in a corresponding one of said cues, each segment having an outer portion defining a top surface bearing a geographically significant representation which is relatively positionally appropriate when the segments are fitted into their corresponding cues and an inner portion defining means for removably securing the segments in their corresponding cues.

4. An instructional globe according to claim 3 wherein said geographically significant representations comprise positionally appropriate portions of said blocks cues segments.

5. An instructional globe comprising a globe-shaped body forming a representation of the earth by a number of information-laden, spherical surface appendages, and wherein said appendages comprise spherical surface segments and wherein there are cues on the surface of the globe having a profile corresponding in configuration to said specific ones of said spherical surface segments, wherein there are attaching means for removably attaching said segments to the globe-shaped body in manners and positions to visually or tactically reinforce the geographical concepts of the world, wherein said cues comprise a plurality of indentations and wherein each of said spherical surface segments in geometrically similar in outline to a corresponding indentation.

6. An instructional globe according to claim 5 wherein said cues comprise a plurality of indentations and each of said spherical segments is geometrically similar in outline to a corresponding indentation.

7. An instructional globe according to claim 6 wherein said globe-shaped body and said spherical segments are formed of resilient material such that said spherical segment can be snapped into its corresponding indentation.

8. An instructional globe according to claim 5 wherein said globe-shaped body comprises a transparent or translucent hollow sphere having an inside surface and said cues comprise imprinted outlines on the inside or outside surface of the sphere, each outline resembling in shape its corresponding spherical surface segment.

9. An instructional globe according to claim 5 wherein said attachment means comprise a resilient rib around the peripheral edge of each spherical segment and a corresponding notch around the periphery of each cue, said rib being adapted to removably snap into said notch and to hold the spherical segment in place when the spherical segment is inserted in its corresponding cue.

10. An instructional globe according to claim 9 wherein said attachment means comprise a notch around the peripheral edge of each spherical segment and a corresponding rib around the periphery of each due, said notch being adapted to snap over said rib and to hold the spherical segment in place when the spherical segment is inserted in its corresponding cue.

11. An instructional globe according to claim 5 wherein said means for removably attaching each spherical segment with the cue comprises a plurality of male and female connector assemblies, each spherical segment and each cue being provided, respectively, with at least one part of one of said male and female connector assemblies.

12. An instructional globe according to claim 5 wherein said spherical segments and said cues contain ferromagnetic elements, said means for removably attaching each spherical segment comprising the magnetic attraction between the pairs of said elements.

13. An instructional globe according to claim 5 wherein said spherical segments are further subdivided in subsegments having geographically significant shapes.

14. An instructional globe comprising a globe-shaped body, a plurality of pre-formed spherical surface segments, each spherical surface segment structurally representing a portion of a geographical globe surface, means for removably attaching each spherical surface segment to the globe-shaped body at a pre-established position and a plurality of cues formed on the globe-shaped body, each cue having a correspondence in shape to a set of said spherical-shaped segments whereby the placement of each of said segments in its respective pre-established position is facilitated and wherein said spherical segments are further subdivided into subsequents having geographically significant shapes, wherein said cues comprise a plurality of indentations and wherein each of said spherical-shaped segments is geometrically similar in outlines to a corresponding indentation.

* * * * *